United States Patent [19]

Tsukamoto

[11] Patent Number: 4,673,208

[45] Date of Patent: Jun. 16, 1987

[54] POWER-OPERATED, EXTENDIBLE AND RETRACTIBLE COVER FOR TRUCK BEDS

[76] Inventor: Masa Tsukamoto, 99 West 1000 North, Blackfoot, Id. 83221

[21] Appl. No.: 815,820

[22] Filed: Jan. 2, 1986

[51] Int. Cl.$^4$ .............................................. B60P 7/04
[52] U.S. Cl. .................................... 296/98; 296/100; 160/243; 160/321
[58] Field of Search .......................... 296/98, 100, 101; 160/243, 245, 321

[56] References Cited

U.S. PATENT DOCUMENTS

| | | | |
|---|---|---|---|
| 3,549,198 | 12/1970 | Cappello | 296/100 |
| 4,023,857 | 5/1977 | Killion | 296/98 |
| 4,030,780 | 6/1977 | Petretti | 296/100 |
| 4,050,734 | 9/1977 | Richard | 296/100 X |
| 4,082,347 | 4/1978 | Petretti | 296/100 X |
| 4,138,154 | 2/1979 | McKeon | 296/98 |
| 4,225,175 | 9/1980 | Fredin | 296/100 X |
| 4,341,416 | 7/1982 | Richard . | |
| 4,380,350 | 4/1983 | Block | 296/98 |

Primary Examiner—Johnny D. Cherry
Assistant Examiner—Russell D. Stormer
Attorney, Agent, or Firm—Philip A. Mallinckrodt

[57] ABSTRACT

An elongate roller, movable back and forth transversely across the bed of a truck from one side thereof, has rolled thereon a cover sheet which is unrolled and re-rolled during the back and forth movement to cover a load in the truck bed. Levers pivotally mounted at opposite ends of the truck carry the roller and are moved by hydraulic power cylinders controlled from inside the cab of the truck. A special chain and sprocket arrangement drives the roller, and a special elastic drawcord and backup plate arrangement at opposite ends of the truck bed secures and seals the cover sheet at such opposite ends of the truck bed.

12 Claims, 6 Drawing Figures

POWER-OPERATED, EXTENDIBLE AND RETRACTIBLE COVER FOR TRUCK BEDS

BACKGROUND OF THE INVENTION

1. Field

This invention relates to apparatus for extending and retracting flexible sheet covers relative to the beds of automotive trucks to protect the load, e.g. to prevent loose material being transported from being blown away during travel.

2. State of the Art

Various arrangements of mechanisms have been proposed heretofore for moving a roller, on which a flexible cover sheet is rolled, back and forth over the bed of a truck from cover anchorage along one wall of the truck bed. Apparatus of this type, having one end of the cover sheet anchored along the forward wall of the truck bed at the cab of the truck, is shown by U.S. Pat. Nos. 3,549,198; 4,050,734; 4,082,347; and 4,341,416. The rollers are power operated and spring biased for tensioning the flexible cover sheet as it is unrolled from the roller and re-rolled on it. U.S. Pat. No. 4,225,175, shows a so-called "chip transport box" that apparently in Sweden is customarily carried on the bed of a truck or trailer. There, a side margin of the cover sheet is attached to a sidewall of the box for back and forth movement between the opposite side walls of such box. Several different arrangements are shown for tensioning the cover sheet and for clamping its end margins against disruption during travel.

3. Objective

A principal objective of the present invention is to provide for side-to-side covering of a truck bed by a relatively long cover sheet on a roller having simple and effective operative mechanism, there being a simple and effective sealing arrangement for the end margins of the cover sheet.

BRIEF SUMMARY OF THE INVENTION

In accordance with the present invention, the operative mechanism for the cover sheet roller comprises a pair of elongate levers arranged to be pivoted at corresponding ends thereof to a truck at opposite ends of the truck bed and journaling the roller between their other corresponding ends for rotation by a special drive arrangement carried by one of the levers for motivation as the levers are swung back and forth. Sealing of the end margins of the cover sheet is accomplished by thickening such end margins and placing them over fixed end plates, respectively, at opposite ends of the truck bed. The plates are canted inwardly of the truck bed as they rise from their respective end walls of the truck bed and have arcuate upper edges, thereby providing, in effect, respective tracks for the cover sheet inwardly of the end margins thereof during the back and forth movement of the cover sheet as it is being wound on and unwound from the roller.

The special drive mechanism comprises a pair of idler wheels spaced apart on and preferably lengthwise of the one lever at the pivoted end thereof, with a flexible connector reversely trained therearound and fastened at its opposite ends to an arcuate guide over which it is also trained, there being a drive wheel mounted coaxially with one of the idler wheels and connected to a driven wheel on the roller shaft by a closed loop of flexible connector which is trained about both drive and driven wheel. Motivation is supplied by reciprocating power means for the levers. Such power means advantageously comprise a pair of hydraulic power cylinders oppositely applied to the respective levers, one being slave to the other.

THE DRAWINGS

The best mode presently contemplated for carrying out the invention in actual practice is shown in the accompanying drawings, in which:

FIG. 1, is a pictorial view of a typical truck equipped with the apparatus of the invention; the view looking toward the front and one side of the truck, with the load covered for travel;

FIG. 2, a fragmentary front elevation of the truck bed taken from behind the front seat of the truck cab, the path of travel of the roller-carrying lever arms, roller, and cover sheet being indicated by broken lines;

FIG. 3, a view corresponding to that of FIG. 2, but being a rear elevation and showing the apparatus at a different stage of its travel;

FIG. 4, a fragmentary side elevation taken from the standpoint of the line 4—4, FIGS. 2 and 3, a portion of the roller being broken out to reveal internal mechanism;

FIG. 5, a fragmentary vertical section taken on the line 5—5 of FIG. 4 and drawn to a larger scale; and FIG. 6, a fragmentary vertical section taken on the line 6—6 of FIG. 2.

DETAILED DESCRIPTION OF THE ILLUSTRATED EMBODIMENT

Figure 1:
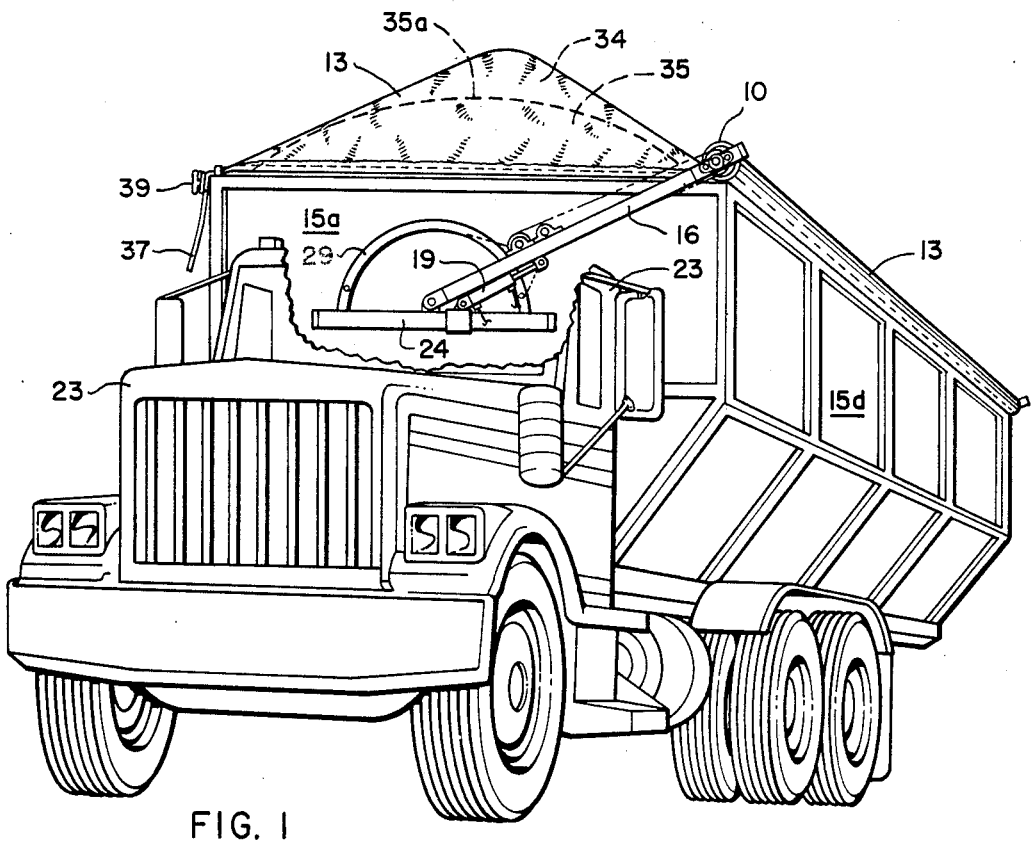

In the form illustrated, the apparatus of the invention comprises an elongate roller 10 having relatively short shafts 11 and 12 extending along and projecting from opposite ends thereof, and having a flexible cover sheet 13 of any suitable protective material, such as canvas or a plastic, rolled thereon. One of the shafts, here the shaft 11, is spring biased internally of the roller in customary manner, see 14, FIG. 4, for maintaining cover sheet 13 taut when being extended over the bed 15 of a truck, for example a dump truck as shown in FIG. 1, on which the apparatus is mounted, whether such truck bed is empty or loaded.

As applied to the truck bed, roller 10 is rotatably mounted, at its opposite ends by means of shafts 11 and 12, in a set of corresponding ends of a pair of elongate levers 16 and 17, which levers, in turn, are pivotally mounted at their opposite set of ends 16a and 17a midway of the widths of the end walls 15a and 15b, respectively, of the truck bed. The free longitudinal edge margin end of cover sheet 13 is fastened to and along one of the side walls 15c and 15d, respectively, which are relatively long. As here shown, such free end of cover sheet 13 is fastened to side wall 15c in any suitable manner, as by a series of screws 18, FIGS. 1 and 3.

Reciprocating means are provided for swinging levers 15 and 16 back and forth on their pivotal mountings. Such means are preferably reversely placed hydraulic, power cylinders 19 and 20 mounted at the end walls of the truck bed and having the otherwise free ends of their reciprocating power arms 19a and 20a pivotally attached to levers 15 and 16, respectively, intermediate the ends of such levers. The power cylinders are connected through a suitable control valve (not shown) to the hydraulic system with which trucks are ordinarily provided, in master-slave relationship as by sets 21 and 22, respectively, of hoses, FIGS. 2 and 3, controls for the hydraulic system being provided as usual within the cab 23 of the truck. Both the lower ends 16a and 17a of the levers 16 and 17 and the lower ends 19b and 20b of power cylinders 19 and 20 are pivotally attached to crossbars 24 and 25, respectively, which are fixedly secured to end walls 15a and 15b, respectively, of the truck bed, such lower ends of the levers being pivotally attached to the crossbars midway of the lengths thereof as illustrated. As can be seen by comparing FIGS. 2 and 3, power cylinders 19 and 20 are mounted on respectively opposite sides of levers 16 and 17, respectively, in accordance with the reverse placement previously mentioned. In the slave relationship, outflowing fluid from one powers the other. This insures perfect coordination of movement of the two levers.

Figure 2:
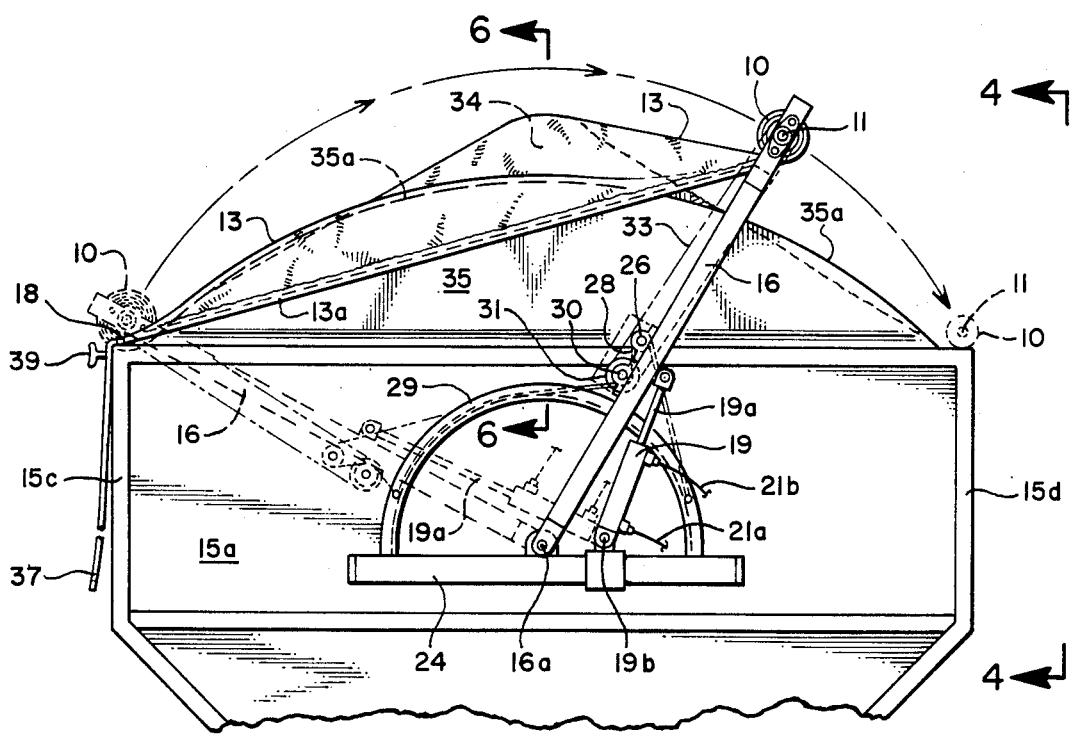
Figure 4:
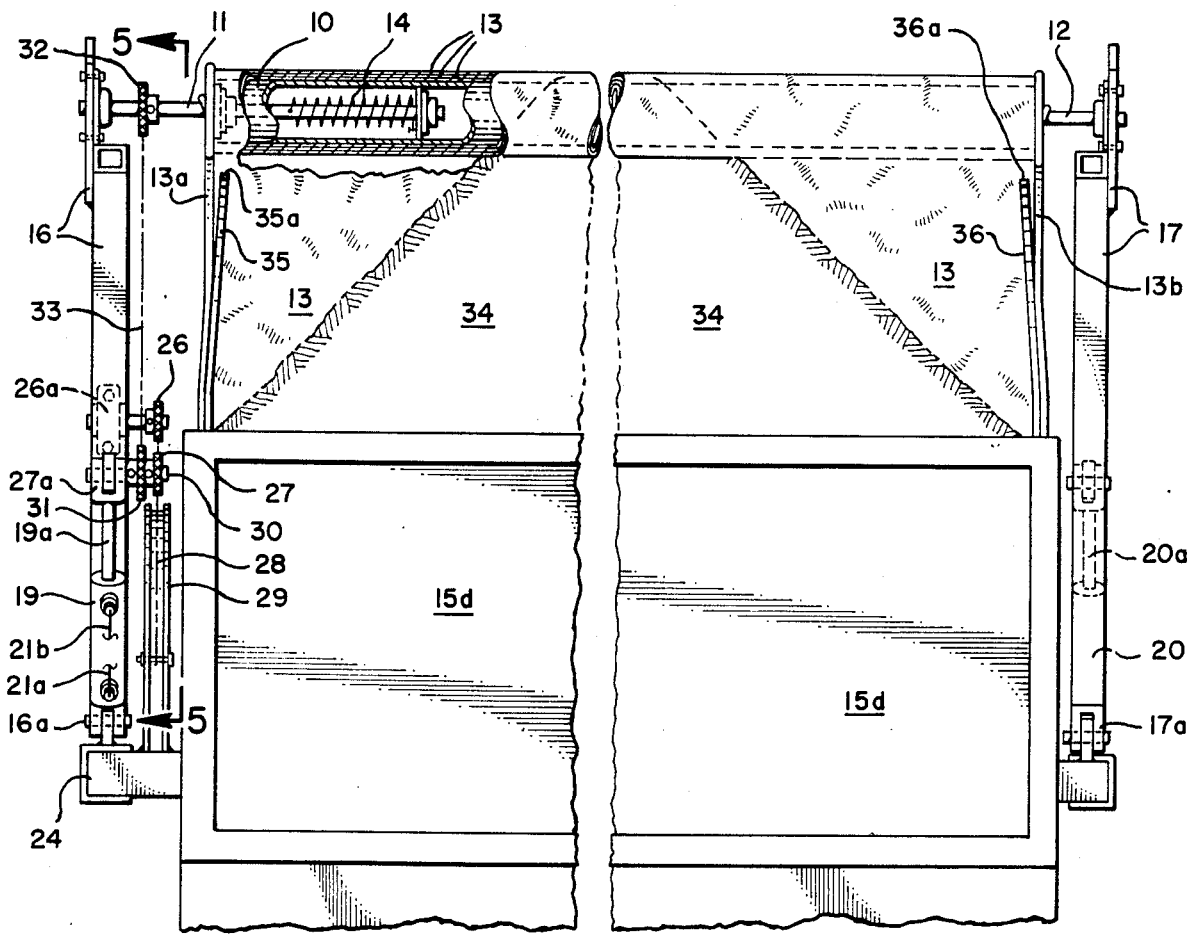
Figure 5:
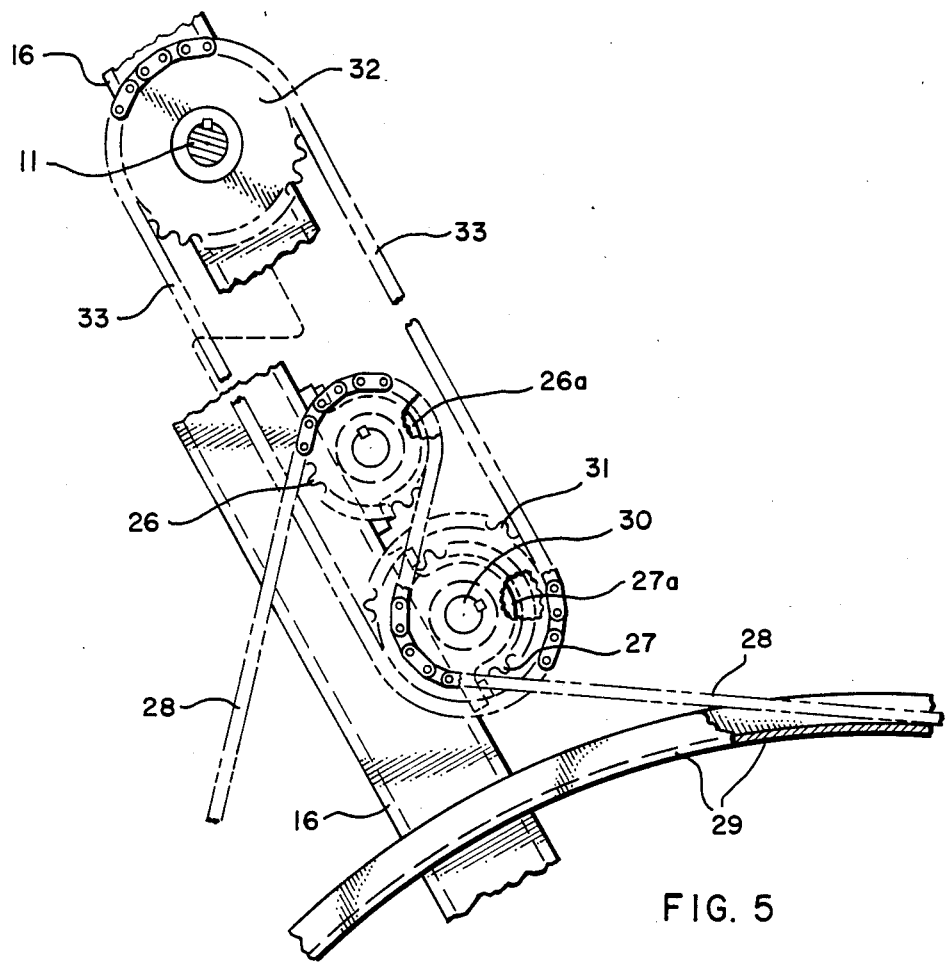
Figure 6:
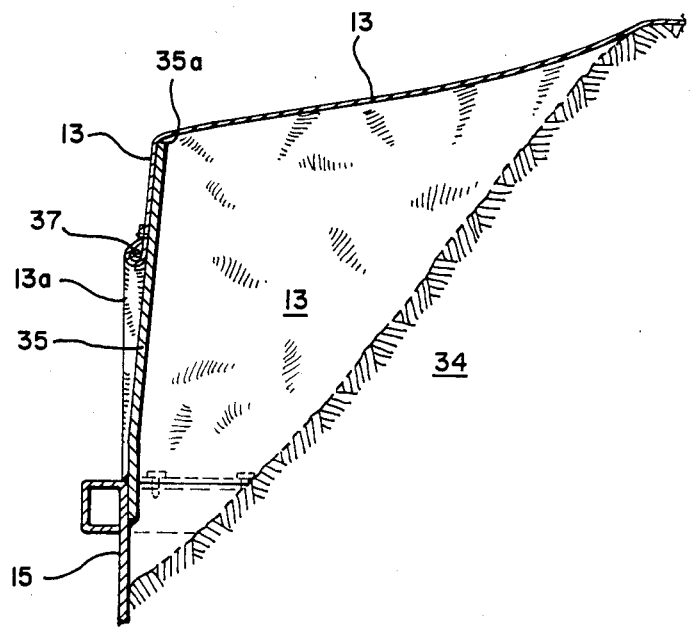

Drive mechanism for the roller is provided between the lever and the corresponding truck bed end wall at at least one end of the roller, here shown as between the lever 16 and truck bed end wall 15a in FIGS. 2, 4, and 5. In the form illustrated, such drive mechanism comprises a pair of spaced-apart sprockets 26 and 27 rotatably carried by pillow blocks 26a and 27a fixedly attached to lever 16 intermediate the length thereof around which is reversely trained a length of sprocket chain 28 that is also trained about a semi-circular track 29 and has its opposite ends fixedly attached to such track. Track 29 is fixedly attached to truck bed end wall 15a and extends above and along crossbar 24 so lever 16 is pivoted at its center. Thus, as lever 16 is moved back and forth on its pivot mounting, sprocket chain 28 reversely rotates sprockets 26 and 27.

Sprocket 27 is fixed to a shaft 30, FIGS. 4 and 5, to which is also fixed a sprocket 31 serving to drive roller 10 by means of a sprocket 32 and a sprocket chain 33, sprocket 32 being fixedly secured to shaft 11. Accordingly, with sprocket 26 serving as an idler, drive sprockets 27 and 31 serve to rotate drive sprocket 32 and, thus, to positively drive roller 10 as lever 16 is moved back and forth on its pivot axis.

Cover sheet 13 is unrolled to cover and protect the load 34 as roller 10 is moved from left to right in FIGS. 1 and 2 and is re-rolled onto roller 10 as the roller is moved from right to left in these same FIGS., meanwhile being held taut by the tension of spring 14. To hold the extended cover sheet 13 against blowing during travel and to substantially seal its edge margins at opposite ends of the truck bed 15, respective cover sheet retaining means are provided at and along opposite ends of such truck bed.

As shown, such retaining means comprise a pair of imperforate plates 35 and 36 respectively secured to and rising above opposite end walls 15a and 15b of truck bed 15, being canted inwardly of the truck bed as they rise from the end walls thereof and having arcuate upper edges 35a and 36a, respectively, so as to provide, in effect, trackways for the cover sheet inwardly of the end margins 13a and 13b thereof. Such end margins are elasticized, preferably by turning them back upon themselves to provide draw passages for receiving elastic draw cords, here indicated at 37 and 38, respectively. This enables the end portions of the cover sheet to adjust their placement levels on backup plates 35 and 36 in accordance with the height of the load and to hug such plates to prevent displacement of the cover sheet. The draw cords are free within the passageways but are anchored at one set of ends to the roller shafts 11 and 12 in any suitable manner and are stretched after the cover sheet is unrolled by grasping and pulling the opposite ends, which are then tied to brackets 39 and 40.

Figure 3:
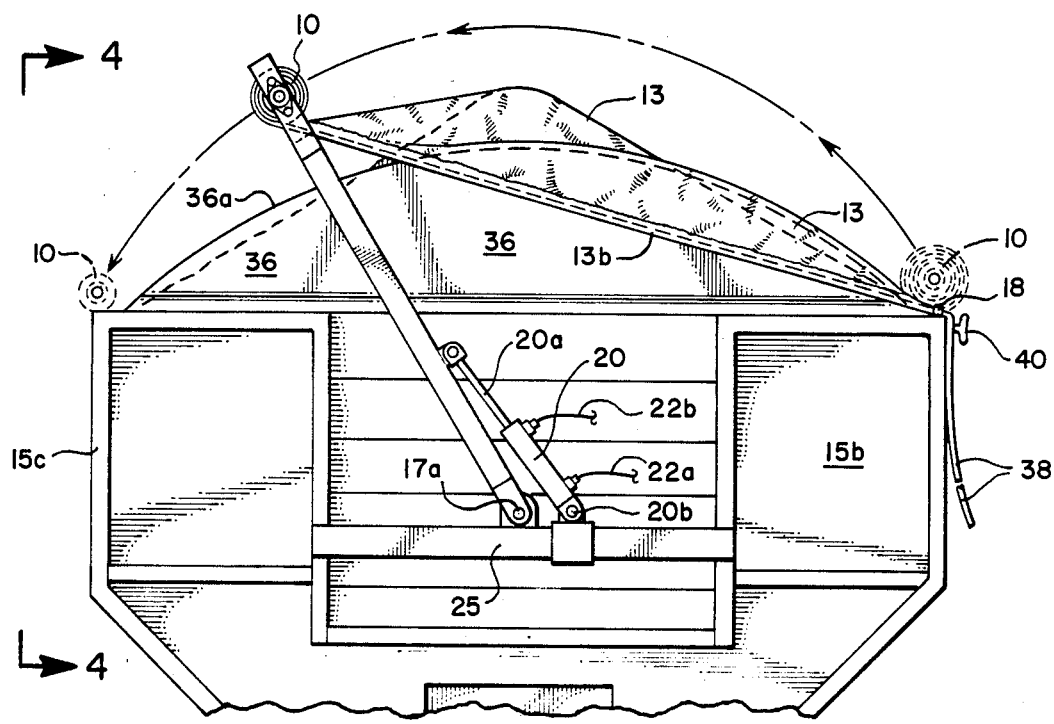

Reverting to the master-slave relationship of the hydraulic power cylinders 19 and 20 as previously mentioned, it can be seen from the drawings that power arm 19a is retracting to move lever 16 to the right from its dotted line position in FIG. 2. At the same time power arm 20a, FIG. 3, is extending to move lever 17 to the left in FIG. 3. Thus, when hose 22a, FIG. 3, is pressurized to extend power arm 20a, the fluid from hose 22b flows into hose 21b, FIG. 2, which retracts power arm 19a, whereupon fluid from power cylinder 19 flows out of hose 21a into the control valve and hydraulic pumping system of the truck.

Although the apparatus of the invention may be incorporated in a truck as original equipment, it may also be packaged and sold in knock-down form as a kit for assembly and application to a truck sometime after original purchase of the truck.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Apparatus for attachment to an automotive truck for extending and retracting a flexible cover sheet over the truck bed, comprising a spring-biased roller of length substantially equivalent to the length of the truck bed and having rolled thereon a flexible cover sheet for the truck bed; a pair of elongate levers, the levers of which are adapted for pivotal attachment at one set of ends thereof to said truck substantially midway of respective opposite ends of the truck bed, the opposite set of ends of said levers being adapted to have opposite ends of said roller rotatably attached thereto, the free end of said cover sheet being attachable to and along one side of the truck bed; reciprocating power means adapted to be connected to said levers intermediate the lengths thereof for moving said levers in unison to move the roller back and forth transversely across the truck bed, said power means being adapted for connection with a power source carried by the truck; drive mechanism for the roller adapted to be positioned between at least one of said levers and a corresponding end wall of the truck bed for positively rotating said roller as it is moved back and forth over the truck bed, said mechanism comprising a pair of spaced-apart wheels rotatably carried by the said at least one lever intermediate its ends; an arcuate guide track adapted to be attached to the truck; a length of flexible connector adapted to be trained over said track and reversely over said pair of wheels and attached at its ends to said truck; a drive wheel having a rotatable axis in common with one of said pair of wheels and fixidly connected thereto for rotation therewith; a second drive wheel affixed to said roller; and a closed loop of flexible connector adapted to be trained around said drive wheels.

2. Apparatus according to claim 1, wherein the idler wheels and drive wheels are sprockets and the connector loops are sprocket chains.

3. Apparatus according to claim 1, additionally including cover sheet retaining means comprising a pair of imperforate plates adapted for attachment to the truck at opposite ends of the truck bed, respectively, and providing along their upper edges respective arcuate trackways for the cover sheet inwardly of the margins of opposite ends of the cover sheet, said plates having breadth capable of closing the ends of the truck bed below said cover sheet and being adapted for canting inwardly of the truck bed when attached thereto, the cover sheet having elasticized end margins for hugging said imperforate plates.

4. Apparatus according to claim 3, wherein the margins of opposite ends of the cover sheet are provided with draw passages for receiving draw cords, respectively; and wherein elastic draw cords are provided for insertion in said passages.

5. An automotive truck equipped with apparatus for extending and retracting a flexible cover sheet over the truck bed, comprising a spring-biased roller of length substantially equivalent to the length of the truck bed and having rolled thereon a flexible cover sheet for the truck bed; a pair of elongate levers, the individual levers of which are pivotally attached at one set of the ends thereof to said truck substantially midway of respective opposite ends of the truck bed, the opposite set of ends of said levers having opposite ends of said roller rotatably attached thereto, the free side margin of said cover sheet being attached to and along one side of said truck bed; reciprocating power means connected to said levers intermediate the lengths thereof for moving said levers in unison to move the roller back and forth transversely across the truck bed, said power means being connected with a power source carried by the truck; drive mechanism for the roller between at least one of said levers and a corresponding end wall of the truck bed for positively rotating said roller as it is moved back and forth over the truck bed, said mechanism comprising a pair of spaced-apart wheels rotatably carried by the said at least one lever intermediate its ends; an arcuate guide track attached to the truck; a length of flexible connector trained over said track and reversely over said pair of wheels and attached at its ends to said truck; a drive wheel having a rotatable axis in common with one of said pair of wheels and fixidly connected thereto for rotation therewith; a second drive wheel affixed axially to said roller; and a closed loop of flexible connector trained around said drive wheels.

6. Apparatus according to claim 5, wherein the idler wheels and drive wheels are sprockets and the connector loops are sprocket chains.

7. Apparatus according to claim 5, additionally including cover sheet retaining means comprising a pair of imperforate plates attached to the truck at opposite ends of the truck bed, respectively, and providing along their upper edges respective arcuate trackways for the cover sheet inwardly of the margins of opposite ends of the cover sheet, said plates closing the ends of said truck bed below said cover sheet and being canted inwardly of the truck bed, the cover sheet having elasticized end margins for hugging said imperforate plates.

8. Apparatus according to claim 7, wherein the margins of opposite ends of the cover sheet are provided with draw passages for receiving draw cords, and elastic draw cords are freely positioned in said passages, respectively, under tension, with one set of ends fastened to opposite ends of the rollers, respectively, and the other ends fastened to the truck.

9. Apparatus according to claim 5, wherein the power means comprise a pair of hydraulic power cylinders, the respective ones of which are placed at opposite sides of the levers with one connected in slave relationship with the other.

10. Apparatus for attachment in an automotive truck for extending and retracting a flexible cover sheet over the truck bed, comprising a spring-biased roller of length substantially equivalent to the length of the truck bed and having rolled thereon a flexible cover sheet for the truck bed; a pair of elongate levers, the levers of which are adapted for pivotal attachment at one set of ends thereof to said truck substantially midway of respective opposite ends of the truck bed, the opposite set of ends of said levers being adapted to have opposite ends of said roller rotatably attached thereto, the free end of said cover sheet being attachable to and along one side of the truck bed; reciprocating power means adapted to be connected to said levers intermediate the lengths thereof for moving said levers in unison to move the roller back and forth transversely across the truck bed, said power means comprising a pair of hydraulic power cylinders, the respective ones of which are placed at respectively opposite sides of said levers, one being connected in slave relationship with the other; and cover sheet retaining means for opposite ends of truck bed, comprising elasticized end margins of the cover sheet, and a pair of cover sheet end margin backup plates adapted for attachment to the truck bed upwardly of and along the end walls thereof.

11. Apparatus according to claim 10, wherein the end margins of the cover sheet are elasticized by draw passages formed therealong and elastic draw cords freely inserted in said draw passages.

12. Apparatus according to claim 10, wherein the backup plates have arcuate upper edges and are bent inwardly as they extend upwardly so as to cant inwardly of the truck bed.

* * * * *